(12) United States Patent
Xia et al.

(10) Patent No.: US 11,010,056 B2
(45) Date of Patent: May 18, 2021

(54) DATA OPERATING METHOD, DEVICE, AND SYSTEM

(71) Applicant: Huawei Technologies Co., Ltd., Shenzhen (CN)

(72) Inventors: Fei Xia, Beijing (CN); Mingyu Chen, Beijing (CN); Dejun Jiang, Beijing (CN); Jin Xiong, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/415,940

(22) Filed: May 17, 2019

(65) Prior Publication Data

US 2019/0272099 A1 Sep. 5, 2019

Related U.S. Application Data

(63) Continuation of application No. 15/357,408, filed on Nov. 21, 2016, now Pat. No. 10,318,165, which is a
(Continued)

(30) Foreign Application Priority Data

May 21, 2014 (CN) .......................... 201410216351.6

(51) Int. Cl.
*G06F 3/06* (2006.01)
*G06F 12/0871* (2016.01)
(Continued)

(52) U.S. Cl.
CPC .............. *G06F 3/061* (2013.01); *G06F 3/064* (2013.01); *G06F 3/0656* (2013.01);
(Continued)

(58) Field of Classification Search
CPC .. G06F 12/00; G06F 12/0868; G06F 12/0871; G06F 12/121; G06F 2212/1016;
(Continued)

(56) References Cited

U.S. PATENT DOCUMENTS 6,052,315 A * 4/2000 Katayama ........... G11C 11/5621
365/189.05
2009/0138633 A1 5/2009 Guo et al.
(Continued)

FOREIGN PATENT DOCUMENTS

CN 1567187 A 1/2005
CN 101131624 A 2/2008
(Continued)

*Primary Examiner* — Zhuo H Li
(74) *Attorney, Agent, or Firm* — Slater Matsil, LLP

(57) ABSTRACT

A data operating method, device, and system are provided and relate to the computer field, so as to resolve a prior-art problem of low efficiency of performing a data operation on a block device by a CPU. The method includes: receiving an operation instruction sent by a CPU; when the operation instruction is a read instruction, reading a first data block in the block device and returning to-be-read data in the first data block to the CPU; or when the operation instruction is a write instruction, writing, into a cache, to-be-written data indicated by the write instruction, and writing, into the block device, a second data block that includes the to-be-written data. The method is used to operate data in a block device.

17 Claims, 5 Drawing Sheets

Related U.S. Application Data continuation of application No. PCT/CN2015/079432, filed on May 21, 2015.

(51) Int. Cl.
  *G06F 12/121*    (2016.01)
  *G06F 12/0868*   (2016.01)
  *G06F 12/00*     (2006.01)

(52) U.S. Cl.
  CPC .......... *G06F 3/0659* (2013.01); *G06F 3/0673* (2013.01); *G06F 3/0676* (2013.01); *G06F 12/00* (2013.01); *G06F 12/0868* (2013.01); *G06F 12/0871* (2013.01); *G06F 12/121* (2013.01); *G06F 2212/1016* (2013.01); *G06F 2212/312* (2013.01); *G06F 2212/461* (2013.01)

(58) Field of Classification Search
  CPC ......... G06F 2212/312; G06F 2212/461; G06F 3/061; G06F 3/064; G06F 3/0656; G06F 3/0659; G06F 3/0673; G06F 3/0676
  See application file for complete search history.

(56) References Cited

U.S. PATENT DOCUMENTS

| | | | |
|---|---|---|---|
| 2011/0246730 A1* | 10/2011 | Yoshida | G06F 3/0616 |
| | | | 711/156 |
| 2011/0296084 A1 | 12/2011 | Nango | |
| 2013/0117503 A1 | 5/2013 | Nellans et al. | |
| 2013/0238859 A1 | 9/2013 | Han | |
| 2014/0019684 A1* | 1/2014 | Wei | G06F 11/1076 |
| | | | 711/114 |
| 2018/0248816 A1 | 8/2018 | Lam | |

FOREIGN PATENT DOCUMENTS

| | | |
|---|---|---|
| CN | 101441551 A | 5/2009 |
| CN | 101727395 A | 6/2010 |
| CN | 102262608 A | 11/2011 |
| CN | 103324578 A | 9/2013 |
| CN | 103680610 A | 3/2014 |

\* cited by examiner

DATA OPERATING METHOD, DEVICE, AND SYSTEM

CROSS-REFERENCE TO RELATED APPLICATIONS

This application is a continuation of U.S. patent application Ser. No. 15/357,408, filed on Nov. 21, 2016, which is a continuation of International Application No. PCT/CN2015/079432, filed on May 21, 2015. The International Application claims priority to Chinese Patent Application No. 201410216351.6, filed on May 21, 2014. All of the aforementioned patent applications are hereby incorporated by reference in their entireties.

TECHNICAL FIELD

The present disclosure relates to the computer field, and in particular, to a data operating method, device, and system.

BACKGROUND

An unified access storage (UAS) system includes multiple storage devices with different features, such as a DRAM (Dynamic Random Access Memory), an nonvolatile memory (NVM), a flash-based solid state disk (SSD), and a hard disk drive (HDD). The DRAM and the NVM are character devices, and this type of device supports data reading and writing by byte/character and is generally used as a memory. The flash-based SSD and the HDD are block devices, and data reading and writing of this type of device can be performed only at a block granularity and is generally used as an external storage device. The block device does not support byte-based addressing. Generally, a block granularity is 512 B (Byte).

In the prior art, for data access at a relatively fine granularity, such as metadata access and database access, a CPU (Central Processing Unit) cannot directly access data in a block device using a load instruction and a store instruction. Instead, the CPU needs to first invoke an application program in a kernel using a series of operation instructions, to read the data in the block device into a DRAM at a block granularity; and then the CPU accesses the data in the DRAM using the load instruction and the store instruction. For example, when the CPU needs to write data of 8 B at a non-block granularity to a block device, the CPU determines corresponding data in the block device according to a destination address of the to-be-written data, and invokes the application program in the kernel using a series of operation instructions, to read the data into the DRAM at a block granularity such as 512 B. Then the CPU combines, using the store instruction, the data of 8 B at the non-block granularity and the data, which is in the DRAM, of 512 B at the block granularity, and finally writes data obtained by means of combination back to the block device at the block granularity.

It may be learned from the foregoing that, before sending an operation instruction to operate data in a block device, the CPU needs to read a to-be-operated data in the block device into the memory using a series of instructions. The operation process is complex, which reduces efficiency of performing a data operation on a block device by a CPU.

SUMMARY

The present disclosure provides a data operating method, device, and system to resolve a prior-art problem of low efficiency of performing a data operation on a block device by a CPU.

To achieve the foregoing objective, the following technical solutions are used in the present disclosure.

According to a first aspect, a data operating method is provided, where the method includes: receiving, by a storage control device, a read instruction sent by a central processing unit CPU, where the read instruction is used to perform a data read operation on a block device; reading, into a cache of the storage control device, a first data block that is in the block device and includes to-be-read data; and returning the to-be-read data in the first data block to the CPU.

With reference to the first aspect, in a first possible implementation manner of the first aspect, the reading, into a cache of the storage control device, a first data block that is in the block device and includes to-be-read data includes: obtaining, from the read instruction, read address information of the to-be-read data in the block device; and reading, into the cache according to the read address information, the first data block that is in the block device and is corresponding to the read address information; and the returning the to-be-read data in the first data block to the CPU includes: extracting the to-be-read data from the first data block in the cache and returning the to-be-read data to the CPU.

According to a second aspect, a data operating method is provided, where the method includes: receiving, by a storage control device, a write instruction sent by a central processing unit CPU, where the write instruction is used to perform a data write operation on a block device; writing, to a cache of the storage control device, to-be-written data indicated by the write instruction; and generating a second data block that includes the to-be-written data, and writing the second data block into the block device.

With reference to the second aspect, in a first possible implementation manner of the second aspect, the write instruction includes data content of the to-be-written data and write address information of the to-be-written data in the block device; before the writing, to a cache of the storage control device, to-be-written data indicated by the write instruction, the method includes: obtaining the data content and the write address information of the to-be-written data; and the writing, to a cache of the storage control device, to-be-written data indicated by the write instruction includes: storing the data content and the write address information of the to-be-written data into the cache.

With reference to the second aspect or the first possible implementation manner of the second aspect, in a second possible implementation manner, the generating a second data block that includes the to-be-written data includes: determining that historical to-be-written data and the to-be-written data that are stored in the cache meet a data block generating condition, where the historical to-be-written data is to-be-written data that is not written into the block device and that is stored in the cache before the to-be-written data is written into the cache; and generating the second data block using the historical to-be-written data and the to-be-written data.

With reference to the second possible implementation manner of the second aspect, in a third possible implementation manner, the determining that historical to-be-written data and the to-be-written data that are stored in the cache meet a data block generating condition includes: determining that write address information of the historical to-be-written data and the write address information of the to-be-written data are consecutive, and that a total data size of the historical to-be-written data and the to-be-written data accords with a block granularity for writing data into the block device.

With reference to the first possible implementation manner of the second aspect, in a fourth possible implementation manner, the generating a second data block that includes the to-be-written data includes: reading, from the block device according to the write address information of the to-be-written data, a data block corresponding to the write address information, and combining the data block and the to-be-written data into the second data block, where the data block is a data block that is stored in the block device and into which the to-be-written data is to be written.

With reference to any one of the second aspect or the first to the fourth possible implementation manners of the second aspect, in a fifth possible implementation manner, before the writing, to a cache of the storage control device, to-be-written data indicated by the write instruction, the method further includes: when no idle space exists in the cache, determining to-be-replaced data in the cache, and writing the to-be-replaced data into the block device, where the to-be-replaced data is historical to-be-written data stored in the cache.

According to a third aspect, a storage control device is provided, where the storage control device includes a cache, and the storage control device further includes: a receiving unit, configured to receive a read instruction sent by a central processing unit CPU, where the read instruction is used to perform a data read operation on a block device; a data operation unit, configured to read, into the cache of the storage control device, a first data block that is in the block device and includes to-be-read data; and a sending unit, configured to return the to-be-read data in the first data block to the CPU.

With reference to the third aspect, in a first possible implementation manner of the third aspect, the storage control device further includes an obtaining unit, configured to obtain, from the read instruction, read address information of the to-be-read data in the block device; the data operation unit is specifically configured to read, into the cache according to the read address information, the first data block that is in the block device and is corresponding to the read address information; and the sending unit is specifically configured to extract the to-be-read data from the first data block in the cache and return the to-be-read data to the CPU.

According to a fourth aspect, a storage control device is provided, where the storage control device includes a cache, and the storage control device further includes: a receiving unit, configured to receive a write instruction sent by a central processing unit CPU, where the write instruction is used to perform a data write operation on a block device; a data operation unit, configured to write, to the cache, to-be-written data indicated by the write instruction; and a data processing unit, configured to generate a second data block that includes the to-be-written data; where the data operation unit is further configured to write the second data block into the block device.

In a first possible implementation manner of the fourth aspect, the write instruction includes data content of the to-be-written data and write address information of the to-be-written data in the block device; the storage control device further includes an obtaining unit, configured to obtain the data content and the write address information of the to-be-written data; and the data operation unit is specifically configured to store the data content and the write address information of the to-be-written data into the cache.

With reference to the fourth aspect or the first possible implementation manner of the fourth aspect, in a second possible implementation manner, the storage control device further includes a determining unit, configured to determine that historical to-be-written data and the to-be-written data that are stored in the cache meet a data block generating condition, where the historical to-be-written data is to-be-written data that is not written into the block device and that is stored in the cache before the to-be-written data is written into the cache; and the data processing unit is specifically configured to generate the second data block using the historical to-be-written data and the to-be-written data.

With reference to the second possible implementation manner of the fourth aspect, in a third possible implementation manner, the determining unit is specifically configured to determine that write address information of the historical to-be-written data and the write address information of the to-be-written data are consecutive, and that a total data size of the historical to-be-written data and the to-be-written data accords with a block granularity for writing data into the block device.

With reference to the first possible implementation manner of the fourth aspect, in a fourth possible implementation manner, the data operation unit is specifically configured to: read, from the block device according to the write address information of the to-be-written data, a data block corresponding to the write address information, where the data block is a data block that is stored in the block device and into which the to-be-written data is to be written; and the data processing unit is specifically configured to combine the data block and the to-be-written data into the second data block.

With reference to any one of the fourth aspect or the first to the fourth possible implementation manners of the fourth aspect, in a fifth possible implementation manner, the storage control device includes the determining unit, configured to: when no idle space exists in the cache, determine to-be-replaced data in the cache; and the data operation unit is further configured to write the to-be-replaced data into the block device, where the to-be-replaced data is historical to-be-written data stored in the cache.

According to a fifth aspect, a data operating system is provided, where the data operating system includes: a storage control device, a central processing unit CPU, and a block device, where the CPU is connected to the storage control device, and the storage control device is connected to the block device; the storage control device includes the storage control device described in the third aspect or the first possible implementation manner of the third aspect; and/or the storage control device includes the storage control device described in any one of the fourth aspect or the five possible implementation manners of the fourth aspect; the CPU is configured to send an operation instruction to the storage control device, such that the storage control device performs a data operation on the block device according to the operation instruction; and the block device is configured to store data.

According to the foregoing solutions, when a storage control device receives an operation instruction that is sent by a CPU and that instructs to perform an operation on a block device, for a read instruction, the storage control device reads, from the block device, a first data block that includes to-be-read data, and returns the to-be-read data to the CPU; for a write instruction, the storage control device writes to-be-written data into a cache of the storage control device, generates a second data block that includes to-be-written data, and writes the second data block into the block device. In this way, the CPU can directly send an operation instruction that instructs to perform an operation on the block device, to operate data in the block device, which simplifies a process of performing a data operation on a block device by a CPU and improves data operation efficiency.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and persons of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by persons of ordinary skill in the art based on the embodiments of the present disclosure without creative efforts shall fall within the protection scope of the present disclosure.

In all the embodiments of the solutions, a data operation includes a data write operation and a data read operation, a read instruction may be a load instruction, and a write instruction may be a store instruction.

Figure 1:
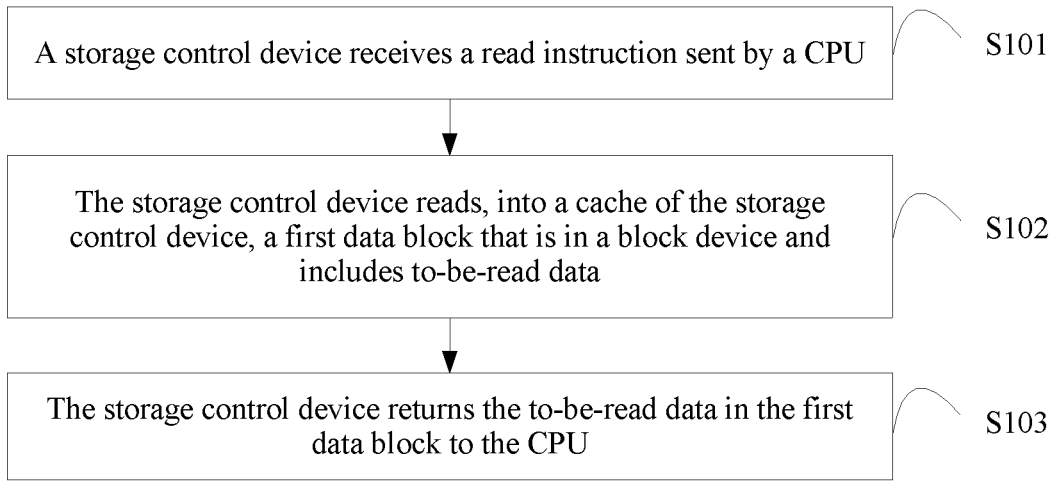
FIG. 1 is a schematic flowchart of a data operating method according to an embodiment of the present disclosure.

An embodiment of the present disclosure provides a data operating method, and the data operation is a data read operation. As shown in FIG. 1, the method includes the following steps.

S101. A storage control device receives a read instruction sent by a CPU.

The read instruction is used to perform a data read operation on a block device.

It should be noted that an operation instruction includes an operation code and an operand. The operation code is used to indicate whether to perform a data read operation or a data write operation on the block device, and the operand includes a source operand and a destination operand and is used to indicate an operation address of the operation instruction. That is, when the CPU also sends a write instruction to the storage control device, the storage control device may determine, according to an operation code in a received operation instruction, whether the operation instruction is a read instruction.

S102. The storage control device reads, into a cache of the storage control device, a first data block that is in a block device and includes to-be-read data.

S103. The storage control device returns the to-be-read data in the first data block to the CPU.

Specifically, the storage control device obtains, from the read instruction, read address information of the to-be-read data in the block device, and reads, into the cache according to the read address information, the first data block that is in the block device and is corresponding to the read address information. The storage control device determines the to-be-read data from the cache and returns the to-be-read data to the CPU.

It should be noted that the cache of the storage control device supports data reading and writing by byte, and the to-be-read data may not necessarily meet a block granularity condition for performing data interaction with the block device. That is, when the block granularity condition is: a size of data that interacts with the block device is a multiple of 512 B, the to-be-read data may be 8 B, and a data size of the first data block may be 512 B or a multiple of 512 B.

For example, after receiving the read instruction sent by the CPU, the storage control device obtains the read address information of the to-be-read data that is in the block device and that the read instruction instructs to read, and determines, according to the read address information, a storage address at which the block device stores the first data block that includes the to-be-read data. The storage control device generates a block device read instruction according to the read instruction. In the block device read instruction, a source operand is the storage address of the first data block, and a destination operand is an address of the first data block in the cache. The storage control device reads the first data block in the block device into the cache of the storage control device using the block device read instruction, and returns the to-be-read data to the CPU, to complete the data read operation of the CPU on the block device.

It should be noted that, it may be learned from the foregoing step S101 to step S103 that, in this embodiment of the present disclosure, the storage control device implements the data operation of the CPU on the block device using the cache of the storage control device, such that data transmission between a block device and a memory in the prior art is avoided, and load of a memory system is alleviated because data in a block device no longer occupies memory space.

According to the foregoing solution, when receiving a read instruction that is sent by a CPU and that instructs to read data from a block device, a storage control device reads, from the block device, a first data block that includes to-be-read data, and returns the to-be-read data to the CPU. In this way, the CPU can directly send a read instruction to perform a read operation on data in the block device, which simplifies a process of performing a data read operation on a block device by a CPU, and improves data reading efficiency.

Figure 2:
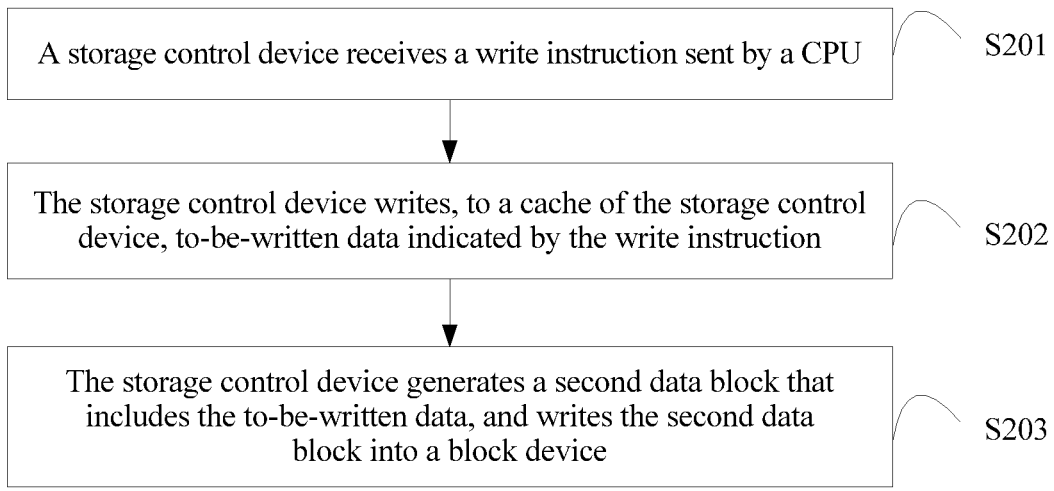
FIG. 2 is a schematic flowchart of another data operating method according to an embodiment of the present disclosure.

An embodiment of the present disclosure provides a data operating method, and the data operation is a data write operation. As shown in FIG. 2, the method includes the following steps.

S201. A storage control device receives a write instruction sent by a CPU.

The write instruction is used to perform a data write operation on a block device.

It should be noted that an operation instruction includes an operation code and an operand. The operation code is used to indicate whether to perform a data read operation or a data write operation on the block device, and the operand includes a source operand and a destination operand and is used to indicate an operation address of the operation instruction. That is, when the CPU also sends a read instruction to the storage control device, the storage control device may determine, according to an operation code in a received operation instruction, whether the operation instruction is a write instruction.

S202. The storage control device writes, to a cache of the storage control device, to-be-written data indicated by the write instruction.

Specifically, the write instruction includes data content of the to-be-written data and write address information of the to-be-written data in the block device, and the storage control device obtains the data content and the write address information of the to-be-written data, and stores the data content and the write address information of the to-be-written data into the cache.

S203. The storage control device generates a second data block that includes the to-be-written data, and writes the second data block into a block device.

Specifically, the following two implementation manners are used by the storage control device to generate the second data block that includes the to-be-written data:

Manner 1: The storage control device determines that historical to-be-written data and the to-be-written data that are stored in the cache meet a data block generating condition, and generates the second data block using the historical to-be-written data and the to-be-written data.

The historical to-be-written data is to-be-written data that is not written into the block device and that is stored in the cache before the to-be-written data is written into the cache.

It should be noted that, after being written into the cache, the to-be-written data is not immediately written back to the block device. Therefore, before the to-be-written data is written into the cache, multiple pieces of historical to-be-written data may already be stored in the cache.

Specifically, when determining that write address of the historical to-be-written data stored in the cache and the write address of the to-be-written data stored in the cache are consecutive in the block device, and that a total data size of the historical to-be-written data and the to-be-written data accords with a block granularity for writing data into the block device, the storage control device generates the second data block using the historical to-be-written data and the to-be-written data.

For example, both a size of the to-be-written data and a size of the historical to-be-written data stored in the cache are 8 B, and a size of data that interacts with the block device is a multiple of 512 B. If before the storage control device writes the to-be-written data into the cache, 63 pieces of historical to-be-written data of 8 B are stored in the cache, and write address of the 63 pieces of historical to-be-written data and the write address of the to-be-written data are consecutive in the block device, the storage control device generates a second data block of 512 B using the 63 pieces of historical to-be-written data and the to-be-written data.

Manner 2: The storage control device reads, from the block device according to the write address information of the to-be-written data, a data block corresponding to the write address information, and combines the data block and the to-be-written data into the second data block.

The data block is a data block that is stored in the block device and into which the to-be-written data is to be written.

It should be noted that, the storage control device may write the to-be-written data into the block device in manner 2 after the to-be-written data is written into the cache and before the cache is fully written with to-be-written data; or may first write the to-be-written data into the block device in manner 1; or after the cache is fully written with to-be-written data, writes the to-be-written data into the block device as to-be-replaced data in manner 2 before the storage control device writes next to-be-written data into the cache.

In addition, data in the second data block written into the block device in manner 1 is all to-be-written data, but the second data block written into the block device in manner 2 includes both the to-be-written data and original data in the block device. That is, when the data block corresponding to the write address information of the to-be-written data is combined with the to-be-written data, the to-be-written data replaces one part of data in the data block, and the other part of data is still original data in the block device.

Optionally, when the storage control device writes the to-be-written data into the cache, when idle space exists in the cache, where the idle space is space in which no to-be-written data is stored, the storage control device directly writes the to-be-written data into the idle space; or when no idle space exists in the cache, that is, the cache is fully written with to-be-written data, the storage control device determines to-be-replaced data in the cache according to a specific replacement policy such as an LRU (Least Recently Used, least recently used) policy, and writes the to-be-written data into the cache after writing the to-be-replaced data into the block device.

For a method for writing the to-be-replaced data into the block device by the storage control device, reference may be specifically made to descriptions of writing the to-be-written data into the block device in manner 1 and manner 2.

It should be noted that, it may be learned from the foregoing step S201 to step S203 that, in this embodiment of the present disclosure, the storage control device implements the data operation of the CPU on the block device using the cache of the storage control device, such that data transmission between a block device and a memory in the prior art is avoided, and load of a memory system is alleviated because data in a block device no longer occupies memory space.

According to the foregoing solution, when receiving a write instruction that is sent by a CPU and that instructs to write data into a block device, a storage control device writes to-be-written data into a cache of the storage control device, generates a second data block that includes the to-be-written data, and writes the second data block into the block device. In this way, the CPU can directly send a write instruction to write data into the block device, which simplifies a process of performing a data write operation on a block device by a CPU, and improves data writing efficiency.

Figure 3:
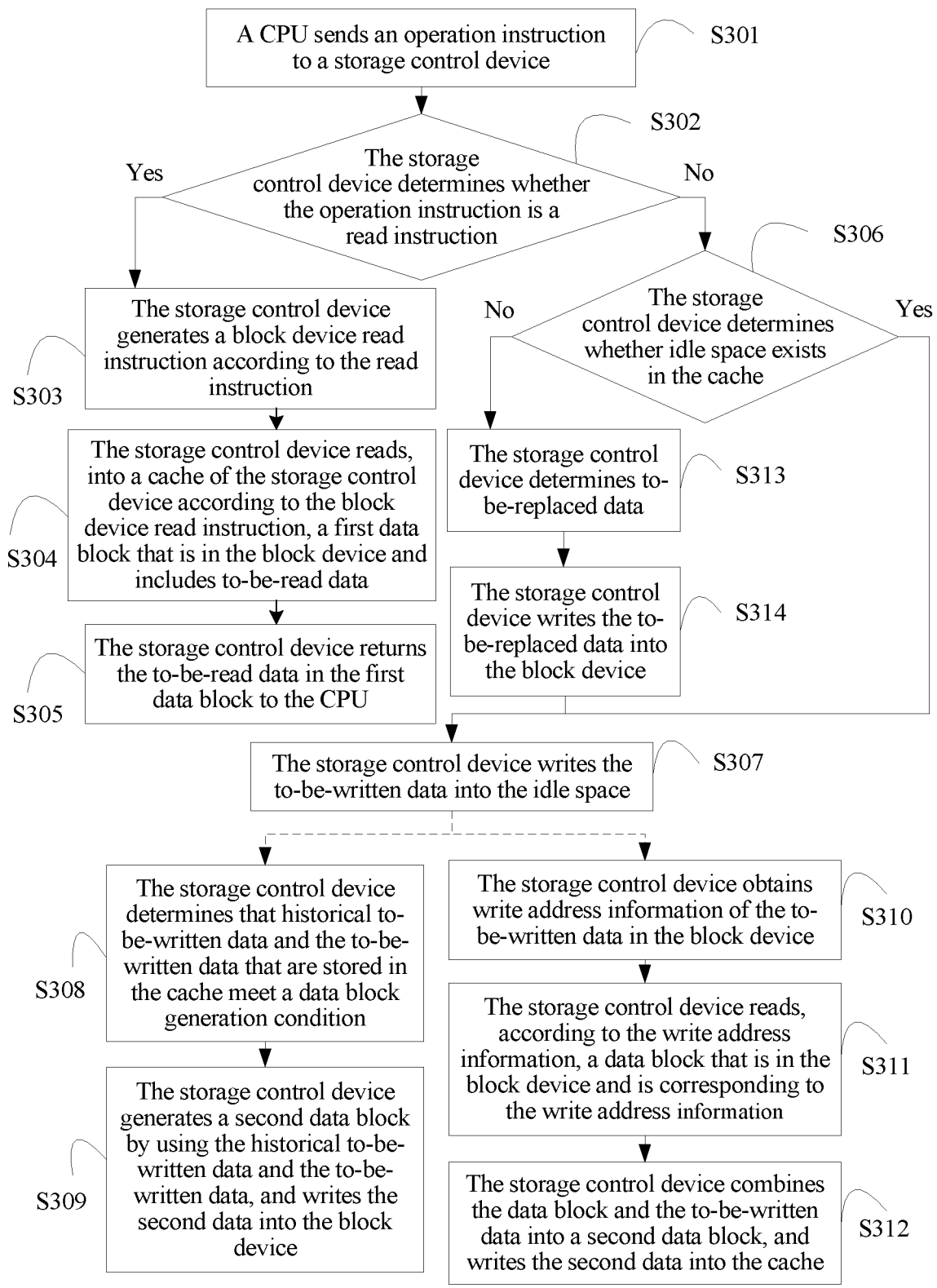
FIG. 3 is a schematic flowchart of another data operating method according to an embodiment of the present disclosure.

To make persons skilled in the art more clearly understand technical solutions of a data operating method provided in an embodiment of the present disclosure, the following describes in detail, using a specific embodiment, the data operating method provided in the present disclosure. The data operation includes a data read operation and a data write operation. As shown in FIG. 3, the method includes the following steps.

S301. A CPU sends an operation instruction to a storage control device.

The operation instruction is used to perform a data operation on a block device.

S302. The storage control device determines whether the operation instruction is a read instruction.

It should be noted that the operation instruction includes an operation code and an operand. The operand includes a source operand and a destination operand and is used to indicate an operation address of the operation instruction. The storage control device determines, according to the operation code in the operation instruction, an operation indicated by the operation instruction.

In a possible implementation manner of this embodiment of the present disclosure, in a UAS system, addressing is performed on a memory (a character device) and an external storage device (a block device) together, and division is performed on a physical address realm of the memory and a physical address realm of the external storage device. Therefore, after receiving the operation instruction sent by the CPU, the storage control device may determine, according to a physical address at which the operation instruction instructs to perform an operation, that an operation object of the operation instruction is a block device. For example, the storage control device determines, according to the operation code in the operation instruction, that the operation instruction is a read instruction, and determines, according to a source operand in the read instruction, a physical address from which the read instruction instructs to perform reading, and when the physical address falls within the physical address realm of the external storage device, determines that a reading object of the read instruction is a block device. The storage control device determines, according to the operation code in the operation instruction, that the operation instruction is a write instruction, and determines, according to a destination operand in the write instruction, a physical address that is of to-be-written data and indicated by the write instruction, and when the physical address falls within the physical address realm of the external storage device, the storage control device determines that a writing object of the write instruction is a block device.

It should be noted that, when the storage control device receives an operation instruction that is sent by the CPU and that instructs to perform an operation on a memory, the storage control device sends the operation instruction to the memory, such that the CPU performs a data operation on the memory using a procedure in the prior art.

If the operation instruction is a read instruction, step S303 to step S305 are performed and the procedure ends; or when the operation instruction is not a read instruction, it indicates that the operation instruction is a write instruction, and step S306 is performed.

S303. The storage control device generates a block device read instruction according to the read instruction.

The block device read instruction is used to read a first data block that is in the block device and that includes to-be-read data.

Specifically, after determining that the operation instruction is a read instruction and an operation object of the operation instruction is a block device, the storage control device obtains read address information of the to-be-read data that is in the block device and that the read instruction instructs to read, and determines, according to the read address information, a storage address at which the block device stores the first data block that includes the to-be-read data. The storage control device generates the block device read instruction according to the read instruction. In the block device read instruction, a source operand is the storage address of the first data block, and a destination operand is an address of the first data block in a cache.

S304. The storage control device reads, into a cache of the storage control device according to the block device read instruction, a first data block that is in the block device and includes to-be-read data.

S305. The storage control device returns the to-be-read data in the first data block to the CPU.

The foregoing step S301 to step S305 are performed to complete the data read operation of the CPU on the block device.

S306. The storage control device determines whether idle space exists in the cache.

The idle space is space in which no historical to-be-written data is stored.

If idle space exists in the cache, step S307 is performed; or when no idle space exists in the cache, step S313 and step S314 are performed.

S307. The storage control device writes the to-be-written data into the idle space.

Specifically, the write instruction includes data content of the to-be-written data and write address information of the to-be-written data in the block device, and the storage control device stores the data content and the write address information of the to-be-written data into the cache.

Optionally, after performing step S307, the storage control device performs steps S308 and S309 and ends the procedure; or performs step S310 to step S312 and ends the procedure.

S308. The storage control device determines that historical to-be-written data and the to-be-written data that are stored in the cache meet a data block generating condition.

It should be noted that, after being written into the cache, the to-be-written data is not immediately written back to the block device. Therefore, before the to-be-written data is written into the cache, multiple pieces of historical to-be-written data may already be stored in the cache.

The data block generating condition is: write address of the historical to-be-written data stored in the cache and the write address of the to-be-written data stored in the cache are consecutive in the block device, and a total data size of the historical to-be-written data and the to-be-written data accords with a block granularity for writing data into the block device.

Optionally, when the storage control device determines that the historical to-be-written data and the to-be-written data that are stored in the cache do not meet the data block generating condition, step S310 to step S312 may be performed.

S309. The storage control device generates a second data block using the historical to-be-written data and the to-be-written data, and writes the second data block into the block device.

S310. The storage control device obtains write address information of the to-be-written data in the block device.

S311. The storage control device reads, according to the write address information, a data block that is in the block device and is corresponding to the write address information.

S312. The storage control device combines the data block and the to-be-written data into a second data block, and writes the second data block into the cache.

It should be noted that after performing step S307, the storage control device may cyclically perform step S301 to step S307 till no idle space exists in the cache of the storage control device. In this case, when the storage control device writes next to-be-written data into the cache, and determines that the to-be-written data is to-be-replaced data, steps S308 and S309 are performed to write the to-be-written data into the block device, or step S310 to step S312 are performed to write the to-be-written data into the block device, and the procedure ends.

S313. The storage control device determines to-be-replaced data.

Specifically, the storage control device determines the to-be-replaced data in the cache according to a specific replacement policy such as an LRU policy.

S314. The storage control device writes the to-be-replaced data into the block device.

It should be noted that for writing the to-be-replaced data into the block device by the storage control device, reference may be specifically made to step S308 and step S309 or step S310 to step S312. Details are not described herein.

In addition, after writing the to-be-replaced data into the block device, the storage control device writes the to-be-written data into the cache, that is, performs step S307.

According to the foregoing solution, when a storage control device receives an operation instruction that is sent by a CPU and that instructs to perform an operation on a block device, for a read instruction, the storage control device reads, from the block device, a first data block that includes to-be-read data, and returns the to-be-read data to the CPU; for a write instruction, the storage control device writes to-be-written data into a cache of the storage control device, generates a second data block that includes the to-be-written data, and writes the second data block into the block device. In this way, the CPU can directly send the operation instruction that instructs to perform an operation on the block device, to operate data in the block device, which simplifies a process of performing a data operation on a block device by a CPU and improves data operation efficiency.

In addition, for brief description, the foregoing method embodiment is expressed as a combination of a series of actions. However, persons skilled in the art should understand that the present disclosure is not limited to the described order of the actions. In addition, the persons skilled in the art should also understand that the embodiments described herein are exemplary embodiments, and the involved actions and modules are not necessarily required by the present disclosure.

Figure 4:
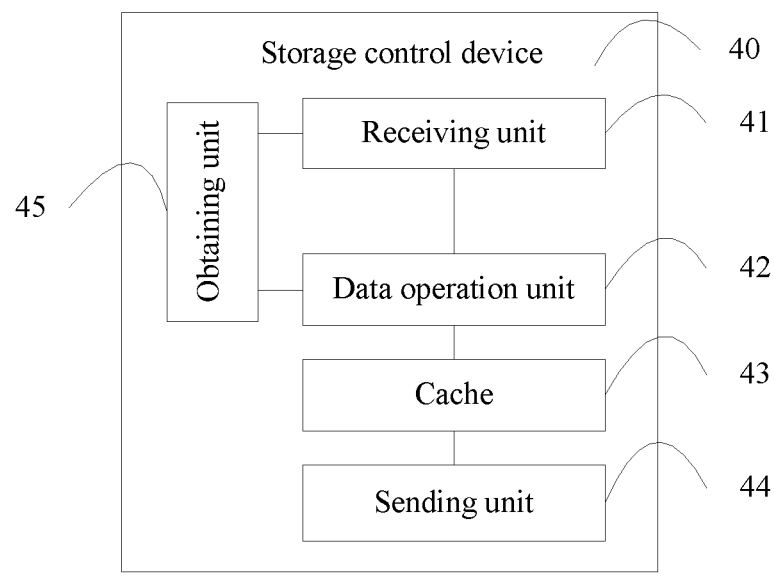
FIG. 4 is a schematic structural diagram of a storage control device according to an embodiment of the present disclosure.

An embodiment of the present disclosure provides a storage control device 40 and is corresponding to the foregoing method embodiment in FIG. 1, and all functional units of the storage control device 40 may be applied to the steps of the foregoing methods. As shown in FIG. 4, the storage control device 40 includes a cache 43 and the storage control device 40 further includes a receiving unit 41, a data operation unit 42, and a sending unit 44.

The receiving unit 41 is configured to receive a read instruction sent by a central processing unit CPU.

The read instruction is used to perform a data read operation on a block device.

The data operation unit 42 is configured to read, into the cache 43 of the storage control device 40, a first data block that is in the block device and includes to-be-read data.

The sending unit 44 is configured to return the to-be-read data in the first data block to the CPU.

Specifically, the storage control device 40 further includes an obtaining unit 45. The obtaining unit 45 obtains, from the read instruction, read address information of the to-be-read data in the block device; the data operation unit 42 specifically reads, into the cache 43 according to the read address information, the first data block that is in the block device and is corresponding to the read address information; and the sending unit 44 determines the to-be-read data from the first data block in the cache 43 and returns the to-be-read data to the CPU.

It should be noted that the cache 43 of the storage control device 40 supports data reading and writing by byte, and the to-be-read data may not necessarily meet a block granularity condition for performing data interaction with the block device. That is, when the block granularity condition is: a size of data that interacts with the block device is a multiple of 512 B, the to-be-read data may be 8 B, and a data size of the first data block may be 512 B or a multiple of 512 B.

For example, after receiving the read instruction sent by the CPU, the storage control device 40 obtains the read address information of the to-be-read data that is in the block device and that the read instruction instructs to read, and determines, according to the read address information, a storage address at which the block device stores the first data block that includes the to-be-read data. The storage control device 40 generates a block device read instruction according to the read instruction. In the block device read instruction, a source operand is the storage address of the first data block, and a destination operand is an address of the first data block in the cache 43. The storage control device 40 reads the first data block in the block device into the cache 43 of the storage control device 40 using the block device read instruction, and returns the to-be-read data to the CPU, to complete the data read operation of the CPU on the block device.

In this way, in this embodiment of the present disclosure, the storage control device 40 implements the data operation of the CPU on the block device using the cache 43 of the storage control device 40, such that data transmission between a block device and a memory in the prior art is avoided, and load of a memory system is alleviated because data in a block device no longer occupies memory space.

It may be clearly understood by persons skilled in the art that, for the purpose of convenient and brief description, division of the foregoing functional modules is taken as an example for illustration. In actual application, the foregoing functions can be allocated to and implemented by different functional modules according to a requirement, that is, an inner structure of an apparatus is divided into different functional modules to implement all or some of the functions described above. For a specific working process of the system, apparatus, and unit described above, reference may be made to a corresponding process in the foregoing method embodiments, and details are not described herein again.

According to the foregoing storage control device 40, when receiving a read instruction that is sent by a CPU and that instructs to read data from a block device, the storage control device 40 reads, from the block device, a first data block that includes to-be-read data, and returns the to-be-read data to the CPU. In this way, the CPU can directly send a read instruction to perform a read operation on data in the block device, which simplifies a process of performing a data read operation on a block device by a CPU, and improves data reading efficiency.

Figure 5:
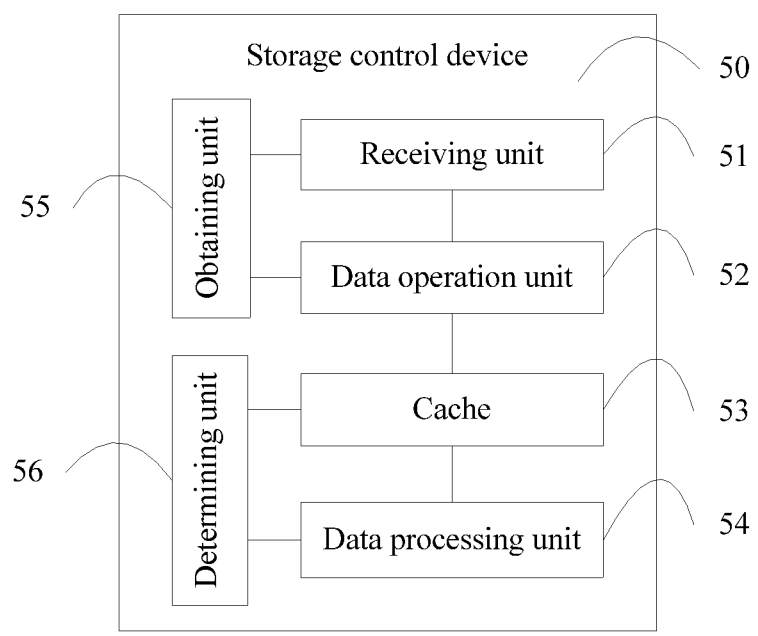
FIG. 5 is a schematic structural diagram of another storage control device according to an embodiment of the present disclosure.

An embodiment of the present disclosure provides another storage control device 50 and is corresponding to the foregoing method embodiment in FIG. 2, and all functional units of the storage control device 50 may be applied to the steps of the foregoing methods. As shown in FIG. 5, the storage control device 50 includes a cache 53 and the storage control device 50 further includes a receiving unit 51, a data operation unit 52, and a data processing unit 54.

The receiving unit 51 is configured to receive a write instruction sent by a central processing unit CPU.

The write instruction is used to perform a data write operation on a block device.

The data operation unit 52 is configured to write, to the cache 53, to-be-written data indicated by the write instruction.

The data processing unit 54 is configured to generate a second data block that includes the to-be-written data.

The data operation unit 52 is further configured to write the second data block into the block device.

Specifically, the write instruction includes data content of the to-be-written data and write address information of the to-be-written data in the block device. The storage control device 50 further includes an obtaining unit 55, configured to obtain the data content and the write address information of the to-be-written data; and the data operation unit 52 stores the data content and the write address information of the to-be-written data into the cache 53.

Further, the following two implementation manners are used by the storage control device 50 to generate the second data block that includes the to-be-written data:

Manner 1: The storage control device 50 further includes a determining unit 56, configured to determine that historical to-be-written data and the to-be-written data that are stored in the cache 53 meet a data block generating condition, and the data processing unit 54 is specifically configured to generate the second data block using the historical to-be-written data and the to-be-written data.

The historical to-be-written data is to-be-written data that is not written into the block device and that is stored in the cache 53 before the to-be-written data is written into the cache 53.

It should be noted that, after being written into the cache 53, the to-be-written data is not immediately written back to the block device. Therefore, before the to-be-written data is written into the cache 53, multiple pieces of historical to-be-written data may already be stored in the cache 53.

Specifically, the determining unit 56 is specifically configured to determine that write address information of the historical to-be-written data and the write address information of the to-be-written data are consecutive, and that a total data size of the historical to-be-written data and the to-be-written data accords with a block granularity for writing data into the block device.

For example, both a size of the to-be-written data and a size of the historical to-be-written data stored in the cache 53 are 8 B, and a size of data that interacts with the block device is a multiple of 512 B. If before the storage control device 50 writes the to-be-written data into the cache 53, 63 pieces of historical to-be-written data of 8 B are stored in the cache 53, and write address of the 63 pieces of historical to-be-written data and the address of the to-be-written data are consecutive in the block device, the storage control device 50 generates a second data block of 512 B using the 63 pieces of historical to-be-written data and the to-be-written data.

Manner 2: The data operation unit 52 is specifically configured to read, from the block device according to the write address information of the to-be-written data, a data block corresponding to the write address information, and the data processing unit 54 is specifically configured to combine the data block and the to-be-written data into the second data block.

The data block is a data block that is stored in the block device and into which the to-be-written data is to be written.

It should be noted that, the storage control device 50 may write the to-be-written data into the block device in manner 2 after the to-be-written data is written into the cache 53 and before the cache 53 is fully written with to-be-written data; or may first write the to-be-written data into the block device in manner 1; or after the cache 53 is fully written with to-be-written data, writes the to-be-written data into the block device as to-be-replaced data in manner 2 before the storage control device 50 writes next to-be-written data into the cache 53.

In addition, data in the second data block written into the block device in manner 1 is all to-be-written data, but the second data block written into the block device in manner 2 includes both the to-be-written data and original data in the block device. That is, when the data block corresponding to the write address information of the to-be-written data is combined with the to-be-written data, the to-be-written data replaces one part of data in the data block, and the other part of data is still original data in the block device.

Optionally, when the storage control device 50 writes the to-be-written data into the cache 53, when idle space exists in the cache 53, where the idle space is space in which no to-be-written data is stored, the storage control device 50 directly writes the to-be-written data into the idle space; or when no idle space exists in the cache 53, that is, the cache 53 is fully written with to-be-written data, the determining unit 56 determines to-be-replaced data in the cache 53 according to a specific replacement policy such as an LRU policy, and writes the to-be-written data into the cache 53 after the data operation unit 52 writes the to-be-replaced data into the block device.

For a method for writing the to-be-replaced data into the block device by the storage control device 50, reference may be specifically made to descriptions of writing the to-be-written data into the block device in manner 1 and manner 2.

In this way, in this embodiment of the present disclosure, the storage control device 50 implements the data operation of the CPU on the block device using the cache 53 of the storage control device 50, such that data transmission between a block device and a memory in the prior art is avoided, and load of a memory system is alleviated because data in a block device no longer occupies memory space.

It may be clearly understood by persons skilled in the art that, for the purpose of convenient and brief description, division of the foregoing functional modules is taken as an example for illustration. In actual application, the foregoing functions can be allocated to and implemented by different functional modules according to a requirement, that is, an inner structure of an apparatus is divided into different functional modules to implement all or some of the functions described above. For a specific working process of the system, apparatus, and unit described above, reference may be made to a corresponding process in the foregoing method embodiments, and details are not described herein again.

According to the foregoing storage control device 50, when receiving a write instruction that is sent by a CPU and that instructs to write data into a block device, the storage control device writes to-be-written data into a cache 53 of the storage control device, generates a second data block that includes the to-be-written data, and writes the second data block into the block device. In this way, the CPU can directly send a write instruction to write data into the block device, which simplifies a process of performing a data write operation on a block device by a CPU, and improves data writing efficiency.

Figure 6:
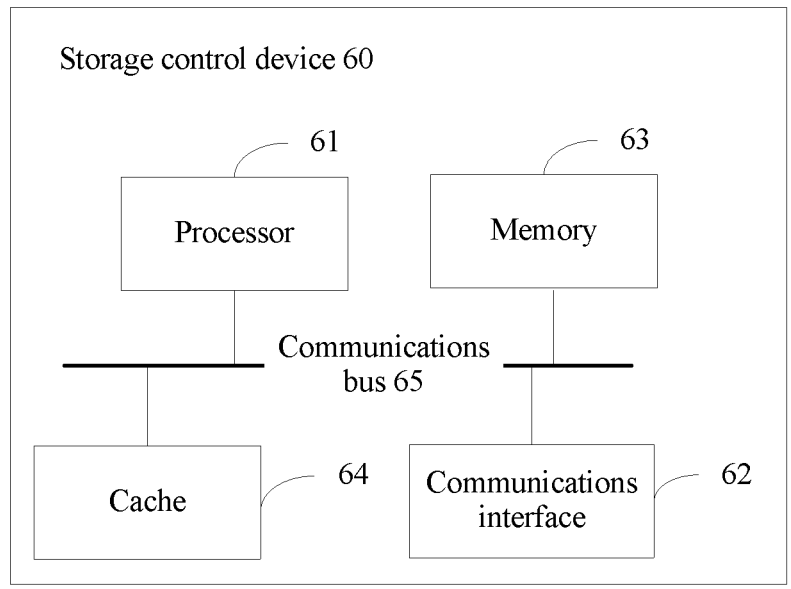
FIG. 6 is a schematic structural diagram of another storage control device according to an embodiment of the present disclosure.

An embodiment of the present disclosure provides another storage control device 60. As shown in FIG. 6, the storage control device 60 includes: a processor (processor) 61, a communications interface (Communications Interface) 62, a memory (memory) 63, a cache 64, and a communications bus 65, where the processor 61, the communications interface 62, the memory 63, and the cache 64 implement mutual communication using the communications bus 65.

The communications interface 62 is configured to communicate with an external device.

The cache 64 is configured to store data received by the storage control device 60 from the external device using the communications interface 62.

The memory 63 is configured to store program code, where the program code includes a computer operation instruction and a network flow diagram. The memory 63 may include a high-speed RAM memory, and may further include a nonvolatile memory (NVM), for example, at least one magnetic disk memory. The memory 63 may be a memory array. The memory 63 may be divided into blocks, and the blocks may be combined into a virtual volume according to a specific rule.

The processor 61 is configured to execute the program code in the memory 63, so as to implement the following operations: receiving a read instruction sent by a central processing unit CPU, where the read instruction is used to perform a data read operation on a block device; reading, into the cache 64 of the storage control device 60, a first data block that is in the block device and includes to-be-read data; and returning the to-be-read data in the first data block to the CPU.

Optionally, the reading, into the cache 64 of the storage control device 60, a first data block that is in the block device and includes to-be-read data includes: obtaining, from the read instruction, read address information of the to-be-read data in the block device; and reading, into the cache 64 according to the read address information, the first data block that is in the block device and is corresponding to the read address information.

The returning the to-be-read data in the first data block to the CPU includes: extracting the to-be-read data from the first data block in the cache 64 and returning the to-be-read data to the CPU.

It may be clearly understood by persons skilled in the art that, for the purpose of convenient and brief description, division of the foregoing functional modules is taken as an example for illustration. In actual application, the foregoing functions can be allocated to and implemented by different functional modules according to a requirement, that is, an inner structure of an apparatus is divided into different functional modules to implement all or some of the functions described above. For a specific working process of the system, apparatus, and unit described above, reference may be made to a corresponding process in the foregoing method embodiments, and details are not described herein again.

Figure 7:
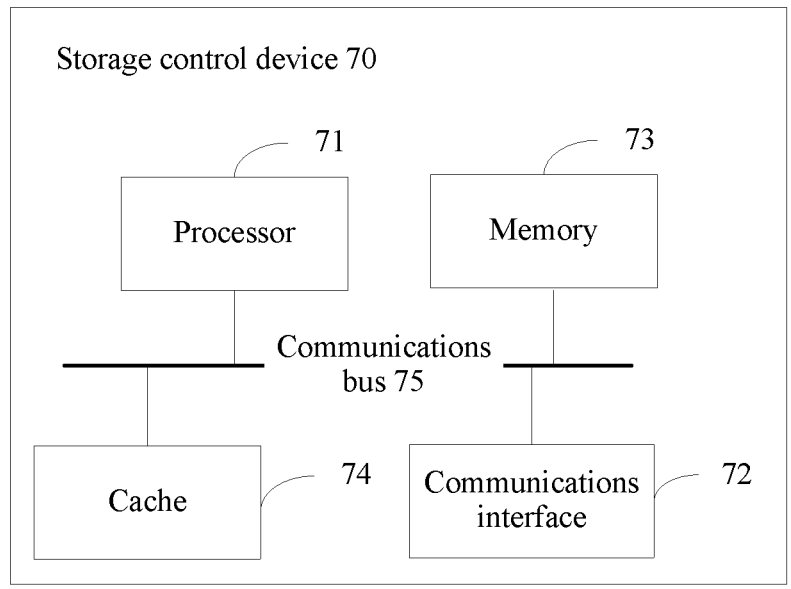
FIG. 7 is a schematic structural diagram of another storage control device according to an embodiment of the present disclosure.

An embodiment of the present disclosure provides another storage control device 70. As shown in FIG. 7, the storage control device 70 includes: a processor (processor) 71, a communications interface 72, a memory 73, a cache 74, and a communications bus 75, where the processor 71, the communications interface 72, the memory 73, and the cache 74 implement mutual communication using the communications bus 75.

The communications interface 72 is configured to communicate with an external device.

The cache 74 is configured to store data received by the storage control device 70 from the external device using the communications interface 72.

The memory 73 is configured to store program code, where the program code includes a computer operation instruction and a network flow diagram. The memory 73 may include a high-speed RAM memory, and may further include a nonvolatile memory (nonvolatile memory), for example, at least one magnetic disk memory. The memory 73 may be a memory array. The memory 73 may be divided into blocks, and the blocks may be combined into a virtual volume according to a specific rule.

The processor 71 is configured to execute the program code in the memory 73, so as to implement the following operations: receiving a write instruction sent by a central processing unit CPU, where the write instruction is used to perform a data write operation on a block device; writing, to the cache 74 of the storage control device 70, to-be-written data indicated by the write instruction; and generating a second data block that includes the to-be-written data, and writing the second data block into the block device.

Optionally, the write instruction includes data content of the to-be-written data and write address information of the to-be-written data in the block device.

Before the writing, to the cache 74 of the storage control device 70, to-be-written data indicated by the write instruction, the operations include: obtaining the data content and the write address information of the to-be-written data; and the writing, to the cache 74 of the storage control device 70, to-be-written data indicated by the write instruction specifically includes: storing the data content and the write address information of the to-be-written data into the cache 74.

Optionally, the generating a second data block that includes the to-be-written data includes: determining that historical to-be-written data and the to-be-written data that are stored in the cache 74 meet a data block generating condition, where the historical to-be-written data is to-be-written data that is not written into the block device and that is stored in the cache 74 before the to-be-written data is written into the cache 74; and generating the second data block using the historical to-be-written data and the to-be-written data.

Optionally, the determining that historical to-be-written data and the to-be-written data that are stored in the cache 74 meet a data block generating condition includes: determining that write address information of the historical to-be-written data and the write address information of the to-be-written data are consecutive, and that a total data size of the historical to-be-written data and the to-be-written data accords with a block granularity for writing data into the block device.

Optionally, the generating a second data block that includes the to-be-written data includes: reading, from the block device according to the write address information of the to-be-written data, a data block corresponding to the write address information, and combining the data block and the to-be-written data into the second data block, where the data block is a data block that is stored in the block device and into which the to-be-written data is to be written.

Optionally, before the writing, to the cache 74 of the storage control device 70, to-be-written data indicated by the write instruction, the operations further include: when no idle space exists in the cache 74, determining to-be-replaced data in the cache 74, and writing the to-be-replaced data into the block device, where the to-be-replaced data is historical to-be-written data stored in the cache 74.

It may be clearly understood by persons skilled in the art that, for the purpose of convenient and brief description, division of the foregoing functional modules is taken as an example for illustration. In actual application, the foregoing functions can be allocated to and implemented by different functional modules according to a requirement, that is, an inner structure of an apparatus is divided into different functional modules to implement all or some of the functions described above. For a specific working process of the system, apparatus, and unit described above, reference may be made to a corresponding process in the foregoing method embodiments, and details are not described herein again.

Figure 8:
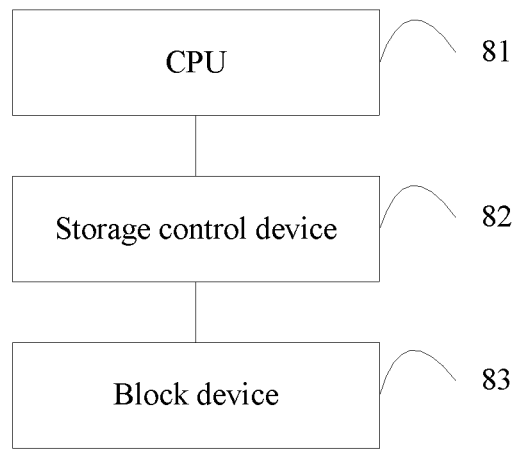
FIG. 8 is a schematic structural diagram of a data operating system according to an embodiment of the present disclosure.

An embodiment of the present disclosure provides a data operating system 80. As shown in FIG. 8, the data operating system 80 includes a CPU 81, a storage control device 82, and a block device 83, where the CPU 81 is connected to the storage control device 82, and the storage control device 82 is connected to the block device 83.

The CPU 81 is configured to send an operation instruction to the storage control device 82, such that the storage control device 82 performs a data operation on the block device 83 according to the operation instruction.

The storage control device 82 includes the storage control device 40 shown in FIG. 4 and/or the storage control device 50 shown in FIG. 5. For a specific function of the storage control device 82, reference may be made to the descriptions in the embodiment corresponding to FIG. 4 and/or the embodiment corresponding to FIG. 5, and details are not described herein.

The block device 83 is configured to store data.

According to the foregoing data operating system, when a storage control device receives an operation instruction that is sent by a CPU and that instructs to perform an operation on a block device, for a read instruction, the storage control device reads, from the block device, a first data block that includes to-be-read data, and returns the to-be-read data to the CPU; for a write instruction, the storage control device writes to-be-written data into a cache of the storage control device, generates a second data block that includes the to-be-written data, and writes the second data block into the block device. In this way, the CPU can directly send the operation instruction that instructs to perform an operation on the block device, to operate data in the block device, which simplifies a process of performing a data operation on a block device by a CPU and improves data operation efficiency.

Figure 9:
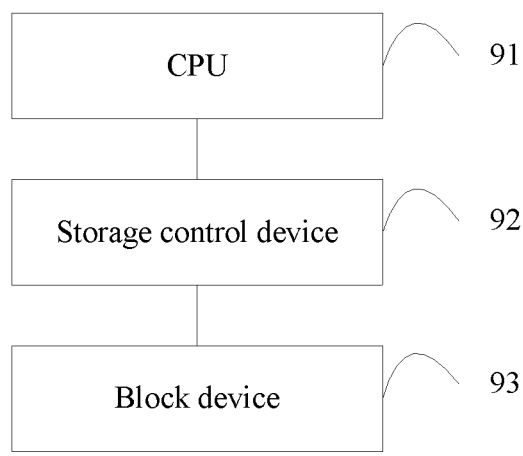
FIG. 9 is a schematic structural diagram of another data operating system according to an embodiment of the present disclosure.

An embodiment of the present disclosure provides a data operating system 900. As shown in FIG. 9, the data operating system 900 includes a CPU 91, a storage control device 92, and a block device 93, where the CPU 91 is connected to the storage control device 92, and the storage control device 92 is connected to the block device 93.

The CPU 91 is configured to send an operation instruction to the storage control device 92, such that the storage control device 92 performs a data operation on the block device 93 according to the operation instruction.

The storage control device 92 includes the storage control device 60 shown in FIG. 6 and/or the storage control device 70 shown in FIG. 7. For a specific function of the storage control device 92, reference may be made to the descriptions in the embodiment corresponding to FIG. 6 and/or the embodiment corresponding to FIG. 7, and details are not described herein.

The block device 93 is configured to store data.

According to the foregoing data operating system, when a storage control device receives an operation instruction that is sent by a CPU and that instructs to perform an operation on a block device, for a read instruction, the storage control device reads, from the block device, a first data block that includes to-be-read data, and returns the to-be-read data to the CPU; for a write instruction, the storage control device writes to-be-written data into a cache of the storage control device, generates a second data block that includes the to-be-written data, and writes the second data block into the block device. In this way, the CPU can directly send the operation instruction that instructs to perform an operation on the block device, to operate data in the block device, which simplifies a process of performing a data operation on a block device by a CPU and improves data operation efficiency.

The foregoing descriptions are merely specific implementation manners of the present disclosure, but are not intended to limit the protection scope of the present disclosure. Any variation or replacement readily figured out by persons skilled in the art within the technical scope disclosed in the present disclosure shall fall within the protection scope of the present disclosure. Therefore, the protection scope of the present disclosure shall be subject to the protection scope of the claims.

What is claimed is:

1. A data operating method performed by a storage control device, the method comprising:
receiving a read instruction instructing the storage control device to perform a data read operation on a block device;
reading a data block from the block device, the data block comprising to-be-read data and additional data other than the to-be-read data;
writing the data block into a cache of the storage control device; and
returning the to-be-read data to a processor;
receiving an additional read instruction instructing the storage device to perform an additional data read operation;
determining that an operation object of the additional read instruction is a character device according to a physical address from which the additional read instruction instructs the additional data read operation to be performed; and
sending the additional read instruction to the character device.

2. The method according to claim 1, wherein:
reading the data block from the block device comprises
obtaining, from the read instruction, read address information of the to-be-read data in the block device, and
reading the data block corresponding to the read address information from the block device; and
returning the to-be-read data in the data block to the processor comprises
extracting the to-be-read data from the data block in the cache, and
returning the to-be-read data to the processor.

3. The method according to claim 1, wherein the to-be-read data does not meet a block granularity condition for performing data interaction with the block device.

4. The method according to claim 1, wherein a total size of the to-be-read data is less than 512 bytes, and wherein a block granularity of the block device is greater than or equal to 512 bytes.

5. The method according to claim 1, wherein a total size of the to-be-read data is less than is less than a total size of the data block, the total size of the data block being equal to a block granularity of the block device.

6. The method according to claim 1, wherein reading the data block from the block device comprises:
    determining that an operation object of the read instruction is the block device according to a physical address from which the read instruction instructs the data read operation to be performed; and
    reading the data block from the block device.

7. A storage control device, comprising:
    a cache configured to cache data;
    a memory configured to store instructions; and
    a first processor coupled to the memory and configured to execute the instructions to
        receive a read instruction instructing the storage control device to perform a data read operation on a block device,
        read a data block from the block device, the data block comprising to-be-read data and additional data other than the to-be-read data,
        write the data block into the cache of the storage control device, and
        return the to-be-read data to a second processor;
    receive an additional read instruction instructing the storage device to perform an additional data read operation;
    determine that an operation object of the additional read instruction is a character device according to a physical address from which the additional read instruction instructs the additional data read operation to be performed; and
    send the additional read instruction to the character device.

8. The device according to claim 7, wherein the first processor is further configured to execute the instructions to:
    obtain read address information of the to-be-read data in the block device from the read instruction; and
    read the data block corresponding to the read address information from the block device; and
    extract the to-be-read data from the data block in the cache.

9. The device according to claim 7, wherein the to-be-read data does not meet a block granularity condition for performing data interaction with the block device.

10. The device according to claim 7, wherein a total size of the to-be-read data is less than 512 bytes, and wherein a block granularity of the block device is greater than or equal to 512 bytes.

11. The device according to claim 7, wherein a total size of the to-be-read data is less than is less than a total size of the data block, the total size of the data block being equal to a block granularity of the block device.

12. The device according to claim 7, wherein the first processor is further configured to execute the instructions to:
    determine that an operation object of the read instruction is the block device according to a physical address from which the read instruction instructs the data read operation to be performed; and
    read the data block from the block device.

13. A system, comprising:
    a processor configured to send a read instruction; and
    a storage control device configured to
        receive the read instruction sent by the processor, the read instruction instructing the storage control device to perform a data read operation on a block device,
        read a data block from the block device, the data block comprising to-be-read data and additional data other than the to-be-read data,
        write the data block into a cache of the storage control device,
        return the to-be-read data to the processor;
    receive an additional read instruction instructing the storage device to perform an additional data read operation;
    determine that an operation object of the additional read instruction is a character device according to a physical address from which the additional read instruction instructs the additional data read operation to be performed; and
    send the additional read instruction to the character device.

14. The system according to claim 13, wherein the storage control device is further configured to:
    obtain read address information of the to-be-read data in the block device from the read instruction;
    read the data block corresponding to the read address information from the block device; and
    extract the to-be-read data from the data block in the cache.

15. The system according to claim 13, wherein the to-be-read data does not meet a block granularity condition for performing data interaction with the block device.

16. The system according to claim 13, wherein a total size of the to-be-read data is less than a total size of the data block, the total size of the data block being equal to a block granularity of the block device.

17. The system according to claim 13, wherein the storage control device is further configured to:
    determine that an operation object of the read instruction is the block device according to a physical address from which the read instruction instructs the data read operation to be performed; and
    read the data block from the block device.

* * * * *